(12) United States Patent
Joos et al.

(10) Patent No.: US 9,804,726 B1
(45) Date of Patent: Oct. 31, 2017

(54) COMPARATIVE GRAPHICAL DATA REPRESENTATION

(75) Inventors: Derek Joos, Rexburg, ID (US); Matt McMurry, Pleasant Grove, UT (US); Mark Schultz, Pleasant Grove, UT (US); Chris Willis, Heber City, UT (US)

(73) Assignee: DOMO, INC., American Fork, UT (US)

( * ) Notice: Subject to any disclaimer, the term of this patent is extended or adjusted under 35 U.S.C. 154(b) by 823 days.

(21) Appl. No.: 13/444,619

(22) Filed: Apr. 11, 2012

Related U.S. Application Data

(60) Provisional application No. 61/506,944, filed on Jul. 12, 2011.

(51) Int. Cl.
   *G06F 3/048* (2013.01)

(52) U.S. Cl.
   CPC .................................. *G06F 3/048* (2013.01)

(58) Field of Classification Search
   CPC ....................................................... G06F 3/048
   See application file for complete search history.

(56) References Cited

U.S. PATENT DOCUMENTS

| | | | |
|---|---|---|---|
| 5,634,133 A | 5/1997 | Kelley | |
| 6,023,280 A | 2/2000 | Becker et al. | |
| 6,188,403 B1 | 2/2001 | Sacerdoti et al. | |
| 6,356,285 B1 | 3/2002 | Burkwald et al. | |
| 8,108,250 B1 * | 1/2012 | Moore et al. | 705/7.42 |
| 8,375,068 B1 * | 2/2013 | Platt et al. | 707/805 |
| 2004/0032427 A1 | 2/2004 | Kekki et al. | |
| 2005/0068320 A1 | 3/2005 | Jaeger | |
| 2008/0079747 A1 | 4/2008 | Saida et al. | |
| 2008/0195643 A1 * | 8/2008 | Sheth-Voss et al. | 707/101 |
| 2008/0250341 A1 * | 10/2008 | Dlugos et al. | 715/771 |
| 2009/0002373 A1 | 1/2009 | MacGregor | |
| 2009/0024928 A1 * | 1/2009 | Westermair | 715/733 |
| 2009/0096812 A1 | 4/2009 | Boixel et al. | |
| 2009/0177988 A1 | 7/2009 | Martins | |
| 2009/0288009 A1 * | 11/2009 | Dulaney | 715/719 |
| 2010/0251151 A1 | 9/2010 | Alsbury et al. | |
| 2011/0289397 A1 * | 11/2011 | Eastmond | G06F 3/0485 715/212 |
| 2011/0307509 A1 * | 12/2011 | Hsiao et al. | 707/769 |
| 2012/0144335 A1 * | 6/2012 | Abeln | G06Q 10/06 715/771 |

* cited by examiner

*Primary Examiner* — Xuyang Xia
(74) *Attorney, Agent, or Firm* — Patent Law Works LLP

(57) ABSTRACT

A user interface is provided for allowing a user to interact with a graphical display. Quantitative data is initially displayed in a graphical format representing absolute values. A comparative graph is also made available, either automatically or in response to user input; the comparative graph presents each data entry according to its relative value as compared with one specific baseline entry.

52 Claims, 7 Drawing Sheets

COMPARATIVE GRAPHICAL DATA REPRESENTATION

CROSS-REFERENCE TO RELATED APPLICATIONS

The present application claims priority from U.S. Provisional Application Ser. No. 61/506,944 for "Difference Comparisons in Data Visualizations," filed Jul. 12, 2011, which is incorporated herein by reference.

FIELD OF THE INVENTION

The present invention relates to graphical displays of quantitative data.

DESCRIPTION OF THE RELATED ART

Electronic devices—such as desktop, laptop, and tablet computers—are often capable of storing and displaying quantitative data in various formats.

While quantitative data can be displayed as a list or table of numbers, it is often helpful to display such data as a graph or chart. Such graphs and charts use visual elements to provide context for displayed data, and to portray trends in quantitative values.

Some examples of well-known graphs and charts include bar graphs, line graphs, and pie charts. Bar graphs display each data entry as a fixed-width rectangle with a height representing the entry's numerical value. Line graphs display each data entry as a point with a height representing that entry's numerical value; a line connects each point to the succeeding point. Pie charts consist of circles with two or more radii that divide the circle into multiple sections. Each section corresponds to one (particular) data entry and has an area proportional to that entry's share of the entire data set's total value.

While these three (and other) chart and graph forms excel at displaying the absolute value of each data entry, users are left to estimate the relative values of any two data entries themselves. Conventional mechanisms for displaying graphical data do not provide an easy way to switch to a comparative view with respect to a selected baseline.

SUMMARY

According to various embodiments of the present invention, an improved user interface is provided for a computer or other device that displays quantitative data in graphical form. The user interface can be configured to display quantitative data using any well-known graphical form wherein data entries are displayed by their absolute value. The user interface further allows the user to interact with the graphical display, for example to invoke a display of a comparative graph wherein the graphical presentation of each data entry indicates its relative value as compared with one specific baseline entry.

In one embodiment, a user input invoking a comparative graph—received by a device such as a mouse, keyboard, touchscreen, or the like—simultaneously invokes the comparative graph and indicates a baseline data entry (from the entire set). In one embodiment, in response to such input, the system of the present invention replaces the graph or chart currently displayed with a similar, comparative graph; in another embodiment, the comparative graph is presented in addition to the initial graph. In the comparative graph, the visual representation of each data entry is based on a derivative data value: the difference between the numeric value of the data entry and the selected baseline entry. For example, for a bar graph or line graph, the height of a bar or point in a comparative graph indicates the difference between the corresponding data entry's value and the baseline entry. For purposes of the description herein, the term "graph" refers to any suitable graphical representation or representations of quantitative data including, without limitation, bar graphs, line graphs, and pie charts.

In one embodiment, the user can provide input, such as a command to dismiss the comparative graph. This causes the currently displayed graph to be replaced by a graph containing the quantitative data in absolute format. Alternatively, dismissing the comparative graph can replace the comparative graph with nothing.

In one embodiment, the user can provide another user input to indicate a new baseline data entry without dismissing the comparative graph. This replaces the currently displayed comparative graph with a graph wherein the dimensions of each object representing a data entry are based on a new derivative data value, representing the difference between that entry and the newly selected baseline entry.

In one embodiment, data entries in the graph are ordered from first to last, and indexed by associating a unique label with each entry. This ordering and these labels allow the user to identify each data entry's representation in the graph.

In one embodiment, one possible graph form is a bar graph. In a bar graph, each data entry corresponds to a rectangle rising vertically from a horizontal axis. The height of each rectangle represents the value of the corresponding data entry. The largest value in the entire set is represented by the tallest rectangle, and each other rectangle's height is a fraction of that height corresponding to the ratio between that data entry and the largest value. One skilled in the art will recognize that the bar graph can be oriented in any direction (horizontally, for example), so that references herein to any particular orientation are merely exemplary.

In response to the user invoking comparative graph and indicating one data entry as a baseline entry, a new graph is displayed (either in addition to or instead of the original graph). The new graph shows the difference between each data entry and the selected baseline entry.

In various embodiments, the comparative graph can be made dynamically available to the user whenever it could sensibly apply to the quantitative data currently being graphically displayed. According to various embodiments, the user can invoke, dismiss, or change the selected baseline entry at will, with the display screen being updated appropriately.

In one embodiment, one possible graph format is a line graph. In a line graph, each data entry is represented by a point, spaced along a horizontal axis and connected to the succeeding point by a straight line. The height of each point represents its entry's value, so that the largest-valued entry is represented by the point farthest above the axis, and each other entry is represented by an appropriately lower point. Again, other orientations are possible.

Concurrent with invoking the comparative graph, the user indicates one position along the horizontal axis. The value at that point is selected as a baseline value. A new, comparative graph is displayed (in addition to or instead of the original graph).

In the comparative line graph, the height of zero represents the baseline value. Thus, the point representing the selected entry is set at zero, and the point appears flush with the horizontal axis. The height of each other point in the graph indicates the difference between its data entry value and the baseline value.

This comparative graph displays a new, derivative data set: the value of each entry relative to the selected entry. The height of each point reflects its entry's value in excess of, or short of, the baseline value. The baseline value can be a positive or negative number.

In one embodiment, two or more line graphs are overlaid on one another, sharing a common horizontal axis. Each data set has its own number of entries and own spacing along the horizontal axis. Each data set forms its own line. Originally, the height of each point is based solely on its corresponding entries (absolute) value. A set of overlaid comparative graphs can be generated, wherein a baseline for each graph is determined based on the value of that graph at a given point along the horizontal axis. Each of the comparative graphs thus shows a value of zero at the selected point. At other points, each graph displays its own data set relative to its own baseline value.

In one embodiment, when the comparative graph creates whitespace or becomes unbalanced compared to the original graph, the horizontal axis is shifted vertically, or the scale of the vertical axis is changed, or both, so that the graph becomes re-centered.

In one embodiment, the comparative graph excludes one or more entries so that it displays only a subset of the comparative data. As an example, this subset could include only the entries following (or preceding) the selected point along the horizontal axis. One skilled in the art will recognize that any suitable subset can be used.

In various embodiments, the comparative graph can be made dynamically available to the user whenever it could sensibly apply to the quantitative data currently being graphically displayed. According to various embodiments, the user can invoke, dismiss, and/or change the selected point along the horizontal axis at will, with the display screen being updated appropriately.

In one embodiment, one possible graph form is a pie chart. A pie chart consists of a circle divided by multiple radii into sections, one section per data entry. The radii are positioned so that each section's area is a fraction of the circle's total area, wherein such fraction represents the corresponding data entry's value as a fraction of the data set's total value.

According to one embodiment of the present invention, responsive to invoking the comparative graph and the user indicating one section of the pie chart, a comparative graph is displayed, either instead of or in addition to the original, default graph. In one embodiment, the comparative pie chart consists of two parts: a supplementary bar graph and an amended pie chart; in another embodiment, only one of these components is included.

The supplementary bar graph contains one entry for each entry in the original pie chart, with heights scaled by data entry value. In one embodiment, the vertical axis of the supplementary bar graph is graduated to indicate multiples of the selected entry's value.

The amended pie chart is similar to the original, default pie chart but has only two sections. One section represents the selected entry, and maintains the same proportion. The other section occupies all the remaining area, corresponding to portion of the data set's entire value totaled by all other entries. The amended pie chart thus allows the user to compare the selected entry with the aggregate of all other entries.

In one embodiment, each data entry's value is displayed in absolute terms in its corresponding section of the amended pie chart; the selected entry's value is displayed in its section and the aggregate value is displayed in the aggregate section. In an alternate embodiment, these data values are expressed as fractions of the data set's entire value. One skilled in the art will realize that these labels can be displayed transiently—for example, for as long as the user positions a cursor over that pie chart section—or persistently until dismissed by user input.

In various embodiments, the comparative graph can be made dynamically available to the user whenever it could sensibly apply to the quantitative data currently being graphically displayed. According to various embodiments, the user can invoke, dismiss, or change the selected pie chart section at will, which may result in the display of a new amended pie chart based on the newly selected entry replacing the previously displayed pie chart on the display screen.

Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

According to various embodiments, the present invention can be implemented on any electronic device equipped to receive, store, and present quantitative data. Such an electronic device may be, for example, a desktop computer, laptop computer, smartphone, tablet computer, or the like.

Although the invention is described herein in connection with an implementation in a computer, one skilled in the art will recognize that the techniques of the present invention can be implemented in other contexts, and indeed in any suitable device capable of presenting quantitative data graphically. Accordingly, the following description is intended to illustrate various embodiments of the invention by way of example, rather than to limit the scope of the claimed invention.

Figure 1A:
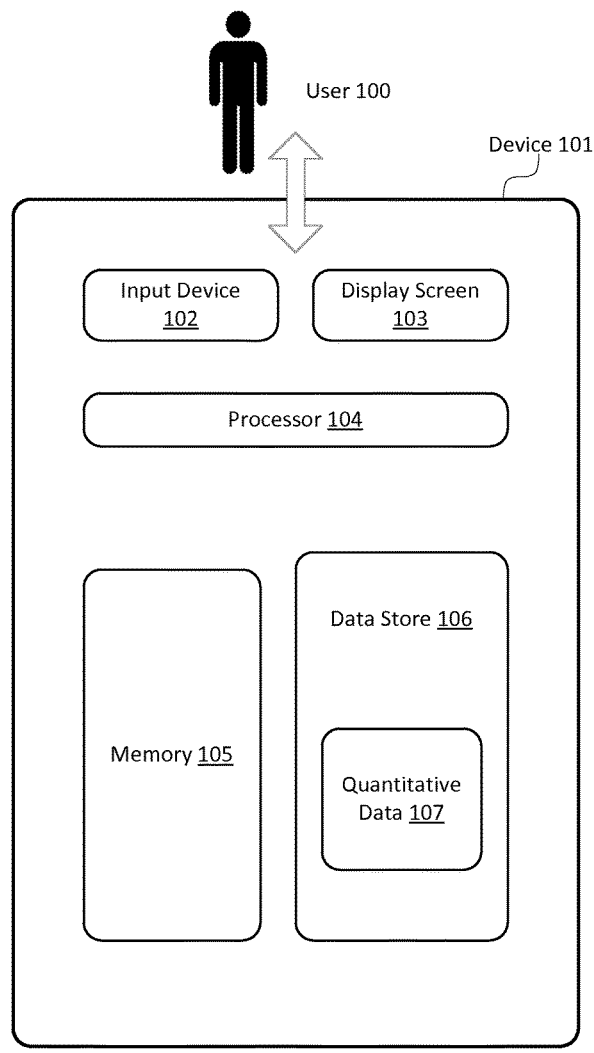
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and present quantitative data.

In one embodiment, device 101 has a number of hardware components well known to those skilled in the art. Input device 102 can be any element that receives input from user 100, including, for example, a keyboard, mouse, stylus, touchscreen, touchpad, trackball, accelerometer, five-way switch, microphone, or the like. Input can be provided via any suitable mode, including for example, one or more of: pointing, tapping, typing, dragging, and/or speech. Display screen 103 can be any element that graphically displays quantitative data.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be any magnetic, optical, or electronic storage device for data in digital form; examples include flash memory, magnetic hard drive, CD-ROM, or the like. In one embodiment, data store 106 stores information describing quantitative data 107.

Data store 106 can be local or remote with respect to the other components of device 101: in one embodiment data entered into device 101 through input device 102 is transmitted to a remote data and held there. This transmission can be done wirelessly, by Ethernet connection, or by any other appropriate means. This communication with other electronic devices is provided as an example and not necessary to practice the invention.

In one embodiment, data store 106 is detachable in the form of a CD-ROM, DVD, flash drive, USB hard drive, or the like. Quantitative data 107 can be entered into such a detachable data store 106 from a source outside of device 101 and later displayed after data store 106 is connected to device 101. In another embodiment, data store 106 is fixed within device 101 and receives data only through input device 102.

Figure 1B:
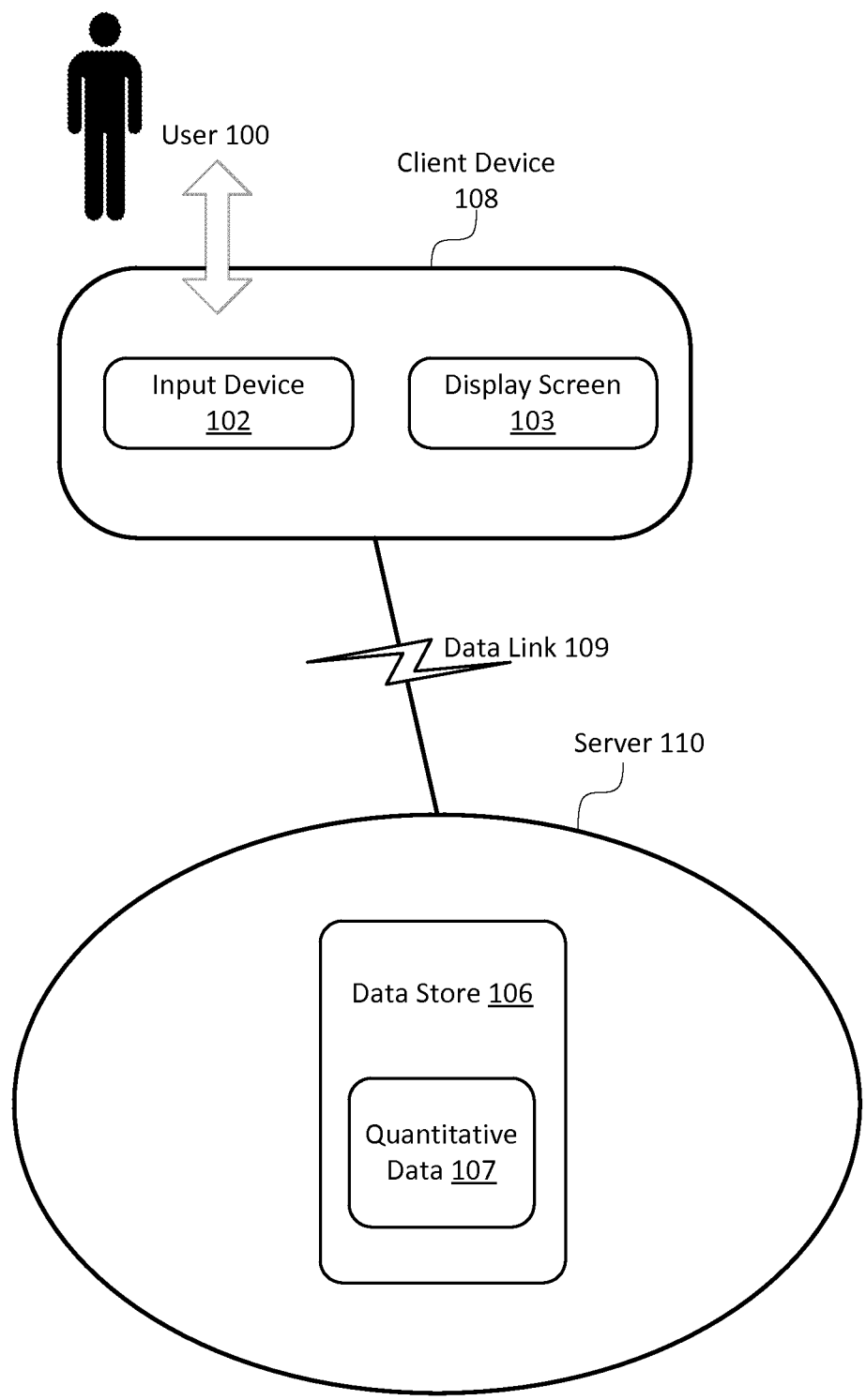
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and other web-based resources from server 110.

Client device 108 can be any electronic device incorporating input device 102 and display screen 103, such as a desktop computer, laptop computer, personal digital assistant (PDA), cellular telephone, smartphone, music player, handheld computer, tablet computer, kiosk, game system, or the like. Data link 109 can be any mechanism for transmitting data between electronic devices, such as a wired or wireless network, or other suitable means. Client device 108 transmits data representing user commands to server 110 via data link 109. Server 110 transmits data representing graphical displays to client device 108 via data link 109.

In this implementation, server 110 is responsible for all data storage and processing, and incorporates data store 106, which stores quantitative data 107. Server 110 may include additional components as needed for retrieving data from data store 106 in response to request from client device 108.

In one embodiment, quantitative data 107 is organized into one or more well-ordered data sets, with one or more data entries in each set. Data store 106, however, can have any suitable structure. Accordingly, the particular organization of quantitative data 107 within data store 106 need not resemble the form it is displayed in to user 100. In one embodiment, an identifying label is also stored along with each data entry, to be displayed along with each data entry.

As described above, quantitative data can be received from a source outside of device 101, or may be pre-loaded on a detachable data store 106. In one embodiment input device 102 is configured to receive data entries from user 100, to be added to quantitative data 107 held in data store 106. User 100 may provide such data entries via the hardware and software components described above according to means well-known to those skilled in the art. Data 107 may come from any other suitable source, or combination of sources, including those mentioned above.

In the examples presented herein, quantitative data 107 is shown as rational numbers, recorded and displayed in decimal form using Arabic numerals. None of this is necessary to practice the essential invention. Indeed, the data could be displayed in any suitable format, including one specially invented for a unique application.

Display screen 103 presents quantitative data 107 to user 100 in numeric and/or graphical form, as described in more detail herein. The data entries presented on display screen 102 may include all of, or some subset of, quantitative data 107. In one embodiment where only some of quantitative data 107 is presented at a time, a dynamic control, such as a scrolling mechanism, may be available via input device 102 to change which data entries are currently displayed.

Data entries from quantitative data 107 are presented to user 100, via display screen 103, in the form of a graph. These graphs use visual cues, such as height, distance, and/or area, to convey the value of each data entry. In one embodiment, a label accompanies each data entry on display screen 103, or can be displayed when the user taps on or clicks on a data entry, or causes an onscreen cursor to hover over a data entry.

By default, quantitative data 107 is presented to user 100 in conventional form where each data entry is displayed according to its absolute value. In one embodiment, a comparative graph can be presented automatically or in response to user input.

In one embodiment, a user input—received by input device 102—invokes a comparative graph, causing display screen 103 to display a comparative graph and also indicating a specific data entry currently being displayed, to serve as the baseline entry for the comparative graph. In one embodiment, such user input includes one or more of: selecting, tapping, clicking, hovering over one of the data points on the graph, selecting a command from a menu, clicking on an icon, entering a command on a keyboard, and/or performing any other suitable input operation(s). The comparative graph can be shown instead of or in addition to the original graph.

The comparative graph presents derivative data calculated by comparing each entry in the data set with the baseline data entry.

In one embodiment, a second user input dismisses the comparative graph, so that display screen 103 again presents quantitative data 107 in the original format.

In one embodiment, a third user input changes the currently selected baseline data entry, so that the derivative data set being displayed is recalculated by comparing the entries in the original data set with the new selected baseline data entry. Display screen 103 is updated accordingly.

Comparative Bar Graphs

In one embodiment, quantitative data 107 is presented in a bar graph. In a bar graph, each data entry is represented by a rectangle rising vertically from a horizontal axis. In the initial form of the graph, the height of each rectangle represents the value of the corresponding data entry. The largest value in the entire set is represented by the tallest rectangle, and each other rectangle's height is a fraction of that height corresponding to the ratio between that data entry and the largest value.

In one embodiment, in the new graph, the height of the rectangle associated with the selected entry is displayed the same way as in absolute format. Rectangles associated with data entries valued lower than the baseline entry gain an additional area (referred to herein as a "difference area"), extending them upwards so that their total height is equal to the rectangle representing the baseline entry. Rectangles associated with data entries valued greater than the baseline entry become divided, with the section above baseline entry's height becoming a difference area.

Thus, for each rectangle, the difference area highlights the difference between the data entry for that rectangle and the baseline entry. Difference areas can be colored, faded, patterned, highlighted, or embellished in some way so as to distinguish it from the other area inside each bar. In one embodiment, a numeric indicator can also be provided inside or adjacent to the difference area, to indicate the difference between that data entry and the baseline entry. The numeric indicator can be displayed automatically, or it can be displayed in response to some command or operation, such as when the user taps on a difference area on a touchscreen, or causes an onscreen cursor to hover over the difference area.

In one embodiment, the comparative view for a bar graph includes a line parallel to the horizontal axis drawn at the height of the top of the baseline entry's rectangle, extending between and through each other rectangle. This line represents the numerical value of the baseline entry, and shows how that baseline value compares to each other entry.

The difference areas and horizontal line help the user visually compare the baseline data entry with each other entry. They present essentially new, derivative data entries (the differences between each data entry and the baseline entry) using the same visual cues—height and size—used in the absolute bar graph.

Figure 2A:
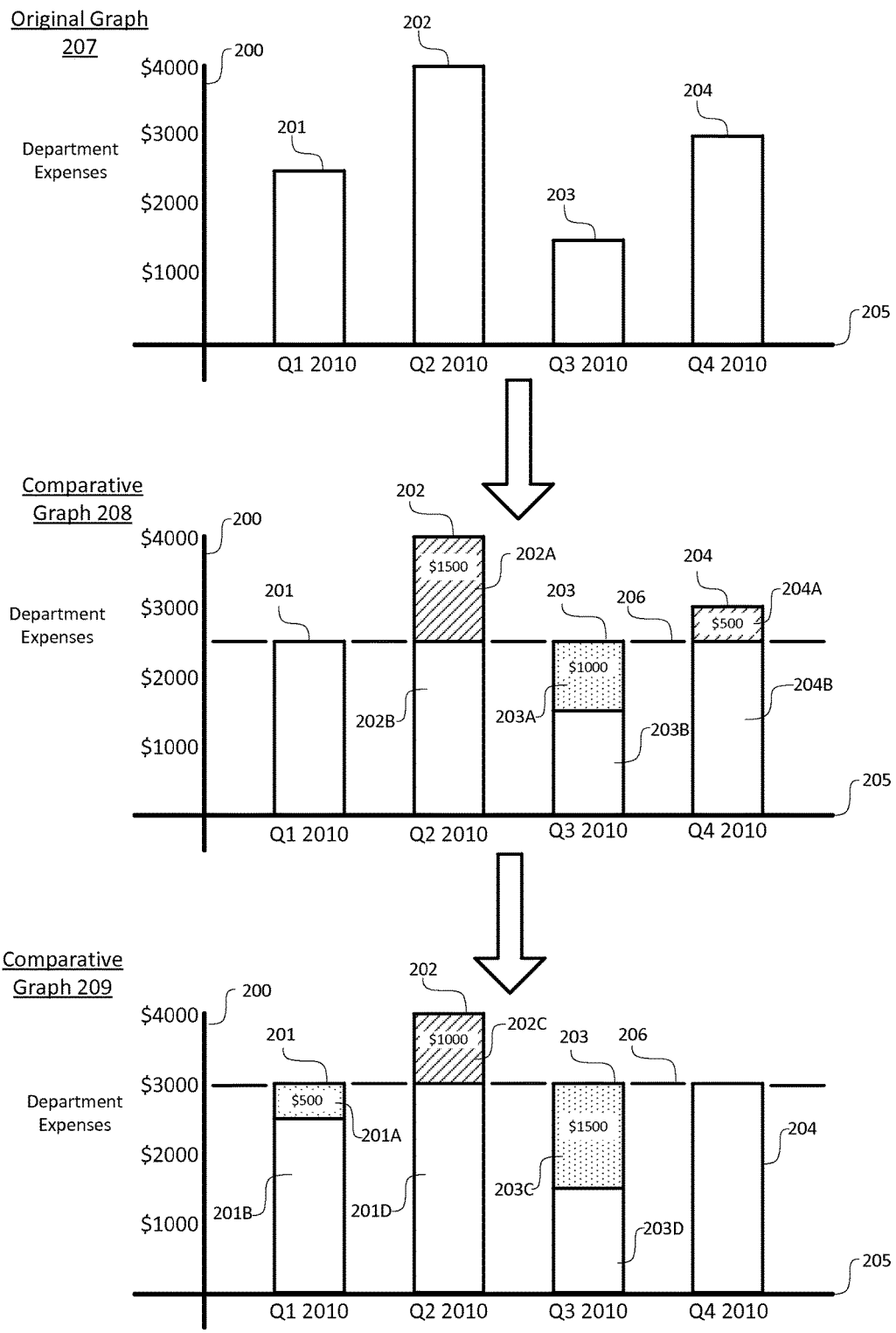
FIG. 2A is an example of a bar graph depicting a data set in an initial form, along with two comparative graphs with two different baseline entries, as displayed according to one embodiment of the present invention.

Referring now to FIG. 2A, there is shown an example of a bar graph as displayed on display screen 103 according to an embodiment of the present invention, first in initial form as original graph 207; and then as two comparative graphs 208 and 209, with two different baseline entries. The example data set represents monthly expenses for a fictional company department for the four quarters of 2010. Original graph 207 displays the data set in absolute terms. The data set is measured in dollars, and Y-axis 200 is graduated by the thousand. X-axis 205 is marked with each data entry's label.

Four data entries labeled "Q1 2010," "Q2 2010," "Q3 2010," and "Q4 2010" are represented by corresponding rectangles 201-204. The values of these data entries are shown by the height of their corresponding rectangles 201-204 as measured along y-axis 200.

In comparative graph 208, the first data entry, labeled "Q1 2010" and represented by rectangle 201, is selected as the baseline entry. This graph might be presented, for example, in response to user 100 tapping or clicking on rectangle 201 or performing some other input operation indicating that a comparative graph should be shown. Rectangles 201-204 represent the same data entries in comparative graph 208 that they represent in original graph 207, with the same labels and same absolute values.

Rectangle 201 represents the selected baseline data entry, and thus has the same height as in original graph 207. Rectangles 202 and 204 represent data entries with greater values, and have been divided at the height of rectangle 201. Areas 202A and 204A, located above the height of rectangle 201, show the amount by which their corresponding data entries exceed the baseline. In one embodiment, as shown, these amounts are denoted in the graph by a distinctive visual manner, such as coloring, shading, cross-hatching, labeling, and/or the like. In the example, a label in area 202A indicates that its data entry exceeds the baseline by $1500, and a label in area 204A indicates that its data entry exceeds the baseline by $500.

Rectangle 203 represents a data entry with a lesser value than the selected baseline data entry. Area 203A shows the amount by which the corresponding data entry is short of the baseline. In one embodiment, as shown, this amount is denoted in the graph by a distinctive visual manner, such as coloring, shading, cross-hatching, labeling, and/or the like. In the example, a label in area 203A indicates that its data entry is short of the baseline by $1000.

In comparative graph 208, line 206 is shown explicitly, drawn parallel to x-axis 205 at the height of the rectangle representing the selected data entry, rectangle 201. Line 206 represents the baseline value, in this case $2500. Line 206 helps user 100 see the relationship between the various rectangles 202, 203, 204 and this baseline value.

In various embodiments, those areas that indicate a positive difference, or surplus, may be displayed using some distinctive visual characteristic, and those areas indicating a negative difference, or deficit, may be displayed using another distinctive visual characteristic. In the example, surpluses are indicated by cross-hatching and deficits are indicated by dotted patterns; however, any suitable visual indicator can be used. Such visual indicators, the displaying of the deficit or surplus numerically, and line 206 are optional features, and some or all of them can be omitted without departing from the essential characteristics of the invention as set forth in the claims.

Referring again to FIG. 2A, in comparative graph 209 the fourth data entry, labeled "Q4 2010" and represented by rectangle 204, is selected as the baseline entry. Rectangles 201-204 represent the same data entries in comparative graph 209 that they represented in graphs 207 and 208, with the same labels and same absolute values.

In comparative graph 209, the first and third data entries, represented by rectangles 201 and 203, have lesser values than the newly selected baseline entry. Their heights are extended upwards to match the height of rectangle 204, with areas 201A and 203C showing deficits. As before, the magnitude of each deficit is displayed numerically, and deficit areas 201A and 203C are presented in a visually distinctive manner, represented in FIG. 2A as a dot pattern.

Areas 201B and 203D represent their corresponding data entries' absolute values, as represented in original graph 207 by rectangles 201 and 203.

Rectangle 202 represents a data entry that is greater than the baseline entry. Thus, its area is divided at the height of rectangle 204 representing the baseline entry. The additional height represents a surplus. As before, the magnitude of the surplus is displayed numerically, and area 202C, representing the surplus, is again presented in a visually distinctive manner, represented in FIG. 2A as a cross-hatched pattern.

In one embodiment, comparative bar graphs when invoked, replace original graph 207 on display screen 103. In another embodiment, comparative graphs, when invoked, appear alongside original graph 207 on display screen 103. In one embodiment, when the user selects a new baseline entry, the currently displayed comparative graph is dismissed and a new one is displayed.

In one embodiment, when the comparative graph is invoked, any value may be selected to serve as the baseline value. In this embodiment, the baseline value need not correspond to any of the data entries, and may be selected by tapping, clicking, or hovering over the appropriate point along y-axis 200. Any other suitable mechanism can be used for selecting a baseline value, whether by direct manipulation, text input, or any other form of input.

Figure 2B:
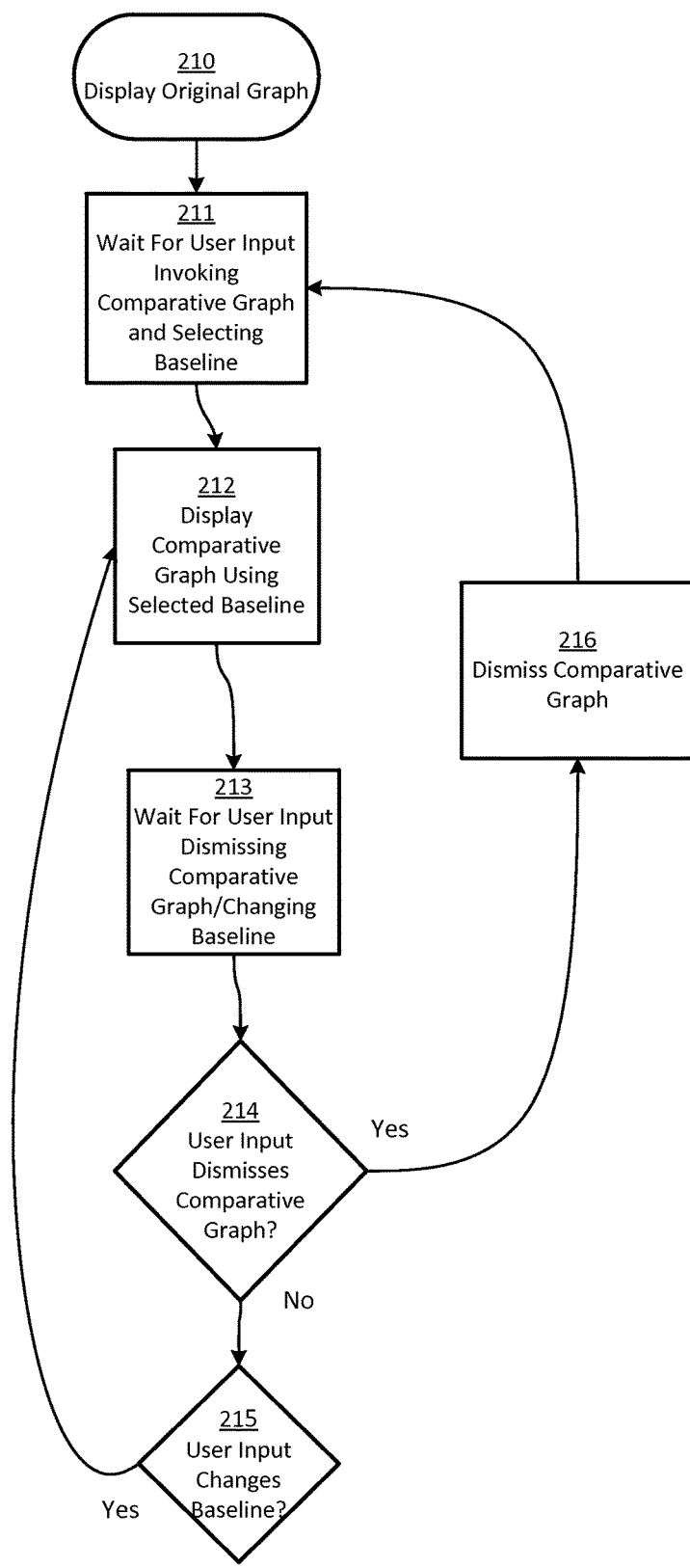
FIG. 2B is a flowchart depicting a process of invoking a graph in comparative form in response to user input, according to one embodiment of the present invention.

Referring now to FIG. 2B, there is shown a flow chart generally depicting a process of displaying comparative graphs responsive to user input, according to one embodiment of the present invention. An initial, original graph is displayed 210 on display screen 103. This graph can be of any appropriate type, such as a bar graph, line graph, pie chart, or the like, and can have any baseline value, including zero (no baseline value), a baseline value from the data set, or a baseline value from outside the data set.

In step 211, display screen 103 continues to display the initial graph until input device 102 receives input from user 100 invoking a comparative graph and selecting a baseline. This input may be of any suitable type, including for example: positioning a cursor over a section of a graph corresponding to a value along an axis or corresponding to a data entry and clicking; positioning a cursor and hovering; tapping a touchscreen with a finger or stylus at a point corresponding to a value or data entry; a voice command indicating a value or data entry; or the like.

In step 212, display screen 103 displays a comparative graph wherein each data entry is graphically represented according to its value relative to the baseline value. This comparative graph may be shown in addition to, or instead of, the initial graph. The displaying of the comparative graph may be accompanied by a transition effect, such as seeing the elements of the graph grow, move, shrink, and/or change color.

In step 213, display screen continues to display the comparative graph (instead of, or in addition to, the original graph) until some predetermined end condition occurs. Display screen 103 may continue to display the comparative graph until dismissed by user input, or it can display the comparative graph for as long as a cursor, stylus, or finger hovers over a graph element. Alternatively, it can display the graph for a predetermined length of time.

In step 214, input from user 100 dismisses the comparative graph. This input, received by input device 102, may be in the form of positioning a cursor, pointer, stylus, or finger over a cancel box on display screen 103, waiting the predetermined time for auto-cancellation, moving a cursor or pointer away from a graph element so that it no longer hovers over it, or the like.

In step 215, input from user 100 indicates a new baseline entry. This may be done by means similar to step 211, where user 100 indicated a baseline entry or value for the current comparative graph.

In step 216, the comparative graph is dismissed and display screen 103 displays the original graph. In one embodiment wherein the comparative graph replaced the original graph on display screen 103, the original graph now replaces the comparative graph. In another embodiment wherein the comparative graph is displayed along with the original graph, the comparative graph is replaced with nothing.

Comparative Line Graphs

In one embodiment, one possible graph format is a line graph. In a line graph, each data entry is represented by a point, spaced along a horizontal axis and connected to the succeeding point by a straight line. The height of each point represents its entry's value, so that the largest-valued entry is represented by the point farthest above the axis, and each other entry is represented by an appropriately lower point.

Figure 3A:
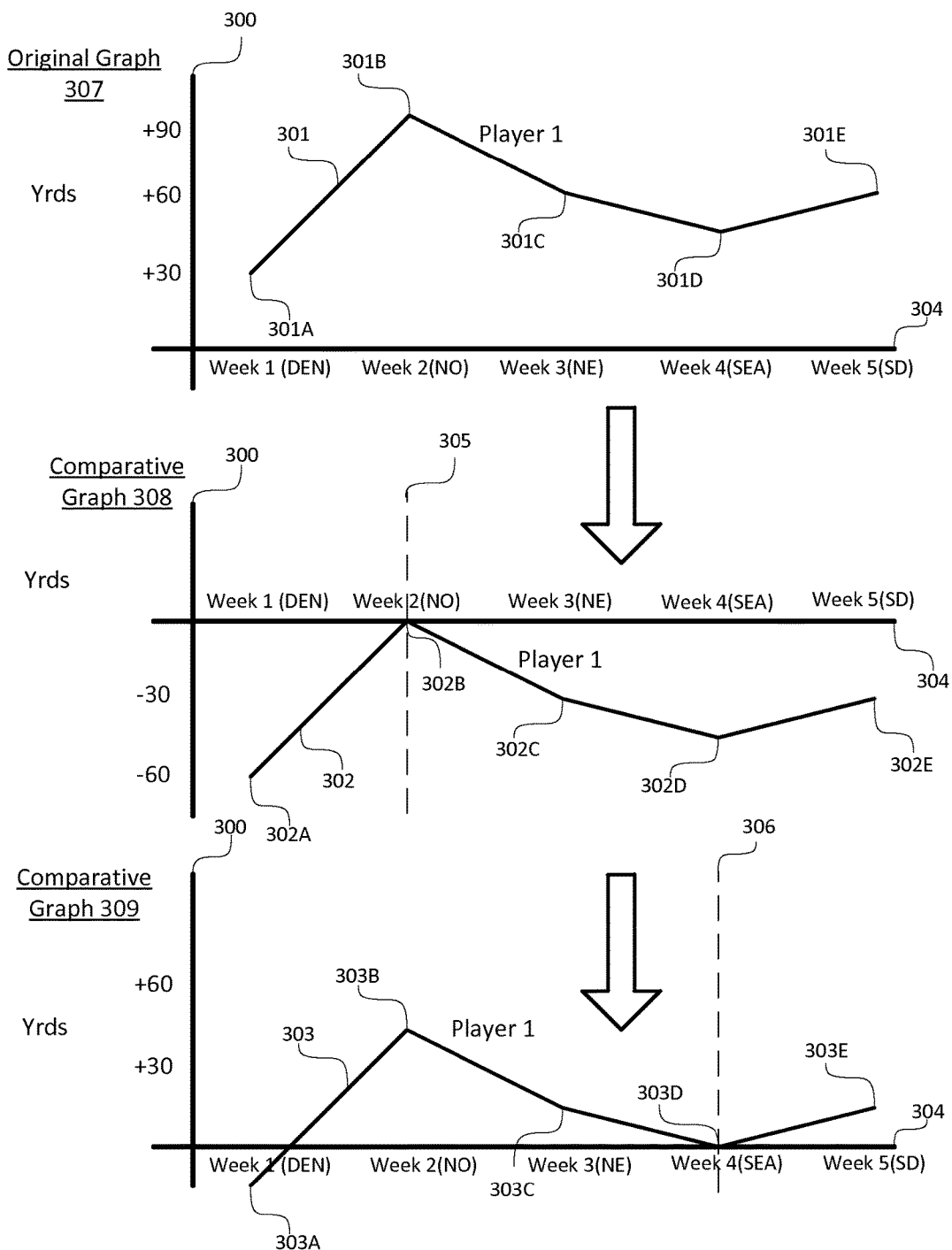
FIG. 3A is an example of a line graph depicting a data set in an initial form, along with two comparative graphs with two different baseline entries, as displayed according to one embodiment of the present invention.

Referring now to FIG. 3A, there are shown examples of a line graph as displayed on display screen 103 according to an embodiment of the present invention; first in initial form (original graph 307), and then as two comparative graphs 308 and 309. The data set in the example, "Player 1," is the fictional performance of a football player through five games. X-axis 304 shows the labels for each data point, including the week number and opponent for each game. The data entries are measured in yards, and Y-axis 300 is graduated to show the heights representing 0, 30, 60 and 90.

In original graph 307, each data point 301A-E corresponds to a data entry. Points 301A through 301E are joined by line 301. Thus, original graph 307 depicts an absolute value for each point along x-axis 304. In this example, the data entries are displayed chronologically. This particular organization is exemplary and not necessary for practicing the invention.

In comparative graph 308, the second data entry, labeled "Week 2(NO)" and corresponding to data point 302B, is selected as the baseline entry. This graph might be presented, for example, in response to user 100 tapping or clicking on data point 301B or performing some other input operation indicating that a comparative graph should be shown.

Data points 302A-E correspond to the same five data entries in data set "Player 1," and are displayed in the same left to right order. The height of each data point 302A-E in graph 308 represents the amount by which the corresponding data point exceeds, or is short of, the baseline entry. Data points 302A through 302E are joined by line 302. Thus, graph 308 depicts the value of each point along line 302 relative to the baseline data entry.

A dashed vertical line 305, parallel to y-axis 300, indicates the position of the baseline entry, corresponding to the position where the line has been zeroed. This dashed vertical line is an optional feature to guide user 100, and can be omitted without departing from the essential characteristics of the invention.

In one embodiment, the data points and line to the left of (or to the right of) the position of the baseline entry are removed for clarity.

In comparative graph 309, the fourth data entry, the one labeled "Week 4(SEA)" and corresponding to data point 303D, has been selected as the baseline. This graph might be presented, for example, in response to user 100 tapping or clicking on data point 302D or performing some other input operation indicating that a comparative graph should be shown.

Data points 303A-E correspond to the same five data entries in data set "Player 1," and are displayed in the same left to right order. The height of each data point 303A-E in graph 309 represents the amount by which the corresponding data entry exceeds, or is short of, the baseline entry. Data points 303A through 303E are joined by line 303. Thus, graph 309 depicts the value of each point along line 303 relative to the baseline data entry.

Dashed vertical line 306, drawn parallel to y-axis 300, indicates the position of the baseline entry, corresponding to the position where the line has been zeroed. Again, this is an optional feature which can be omitted without departing from the essential characteristics of the invention.

Figure 3B:
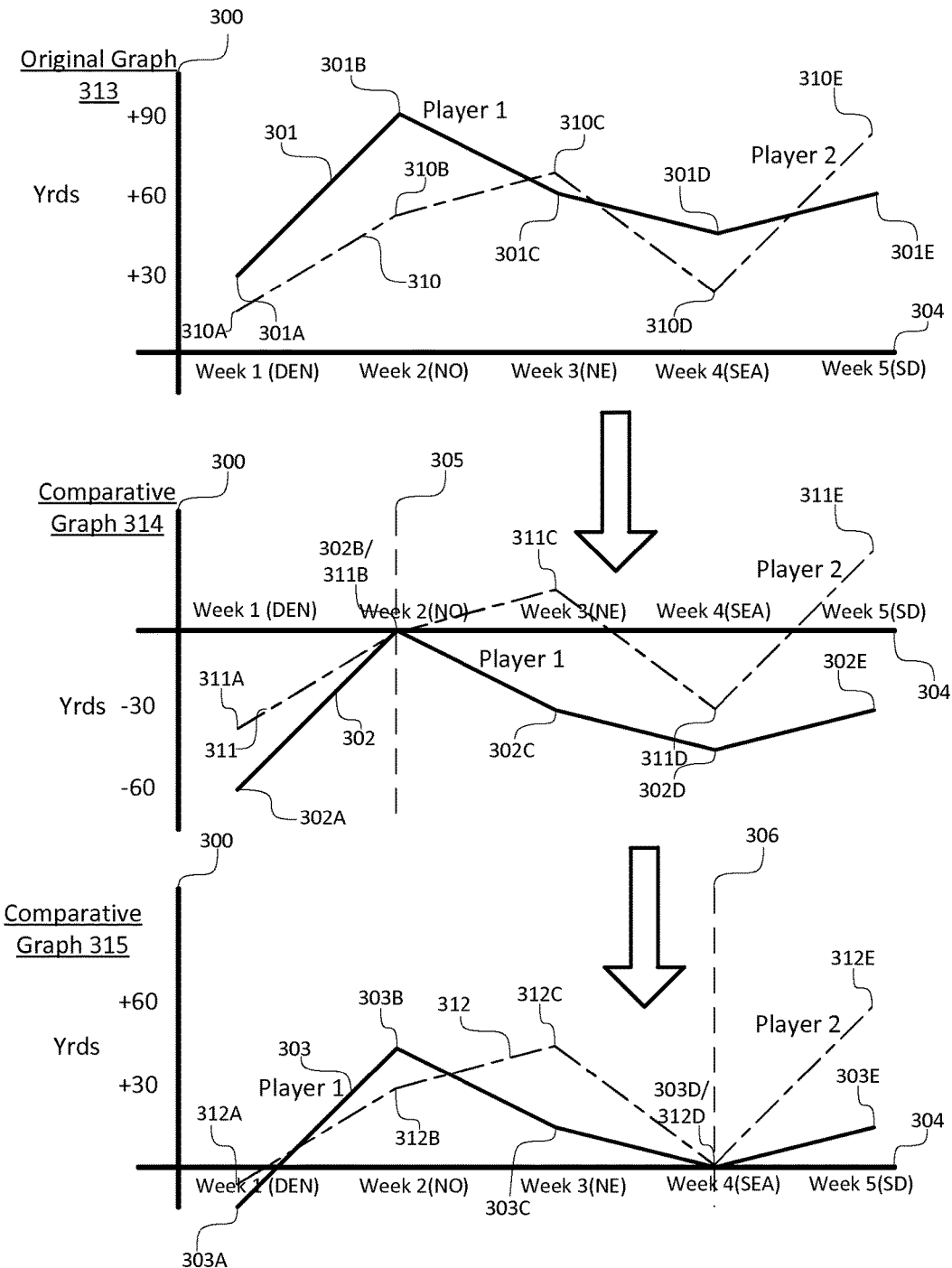
FIG. 3B is an example of a line graph depicting two overlapping data sets in an initial form, along with two comparative graphs with two different baseline entries, as displayed according to one embodiment of the present invention.

Referring now to FIG. 3B, there is shown an initial form of the graph (original graph 313), displaying both the data set shown in FIG. 3A and an additional data set, as displayed on display screen 103 according to an embodiment of the present invention. The two data sets are overlaid on one another.

In original graph 313, each data point 301A-E corresponds to a data entry in the first data set, and each data point 310A-E corresponds to a data entry in the second data set. In graph 313, the height of each data point represents the value of the corresponding entry. Points 301A through 301E are joined by line 301, and points 310A through 310E are joined by line 310. Thus, graph 313 depicts an absolute value for each point along x-axis 304 for both data sets.

Comparative graph 314 depicts the same data sets as graph 313, with the second data entry in each set, the entries labeled "Week 2(NO)," selected as the baseline entry for each set, respectively.

In comparative graph 314, each data point 302A-E corresponds to the same data entry (from the first data set) as each respective data point 301A-E in graph 313. Similarly, each data point 311A-E corresponds to the same data entry as each respective data point 310A-E in graph 313. The height of each data point in graph 314 represents the amount by which the corresponding data entry (in each set) exceeds, or is short of, the baseline entry for the appropriate set. Data points 302A through 302E are joined by line 302, and data points 311A through 311E are joined by line 311. Thus, graph 314 depicts both the value of each point along X-axis 304 relative to its baseline entry (represented in graph 313 by point 301B), and the value of each point along A-axis 304 relative to its baseline entry (represented in graph 313 by point 311B).

In comparative graph 315, the same data sets are depicted, but the fourth data entry in each set, the entries labeled "Week 4(SEA)," has been selected as the baseline entry for each set, respectively.

In comparative graph 315, each data point 303A-E corresponds to the same data entry (from the first data set) as each respective data point 301A-E in graph 313. Similarly, each data point 312A-E corresponds to the same data entry as each respective data point 310A-E in graph 313. The height of each data point in graph 315 represents the amount by which the corresponding data entry (in each set) exceeds, or is short of, the baseline entry for the appropriate set. Data points 303A through 303E are joined by line 303, and data points 312A through 312E are joined by line 312. Thus, graph 315 depicts both the value of each point along X-axis 304 relative to its baseline entry (represented in graph 313 by point 301D), and the value of each point along X-axis 304 relative to its baseline entry (represented in graph 313 by point 310D).

In one embodiment, user 100 may adjust the baseline value, causing display 103 to update graph(s) dynamically to reflect comparisons with the new baseline value. Such functionality may be available for line graphs, bar graphs, other appropriate graphs, or any combination of these. For example, user 100 may adjust the baseline value by dragging a cursor or pointer horizontally or vertically with a mouse, touch, or keyboard command, or any other suitable means, or any combination of these.

Comparative Pie Charts

In one embodiment, one possible graph form is a pie chart. A pie chart consists of a circle divided by multiple radii into sections, one section per data entry. The radii are positioned so that each section's area is a fraction of the circle's total area, wherein such fraction represents the corresponding data entry's value as a fraction of the data set's total value.

Figure 4:
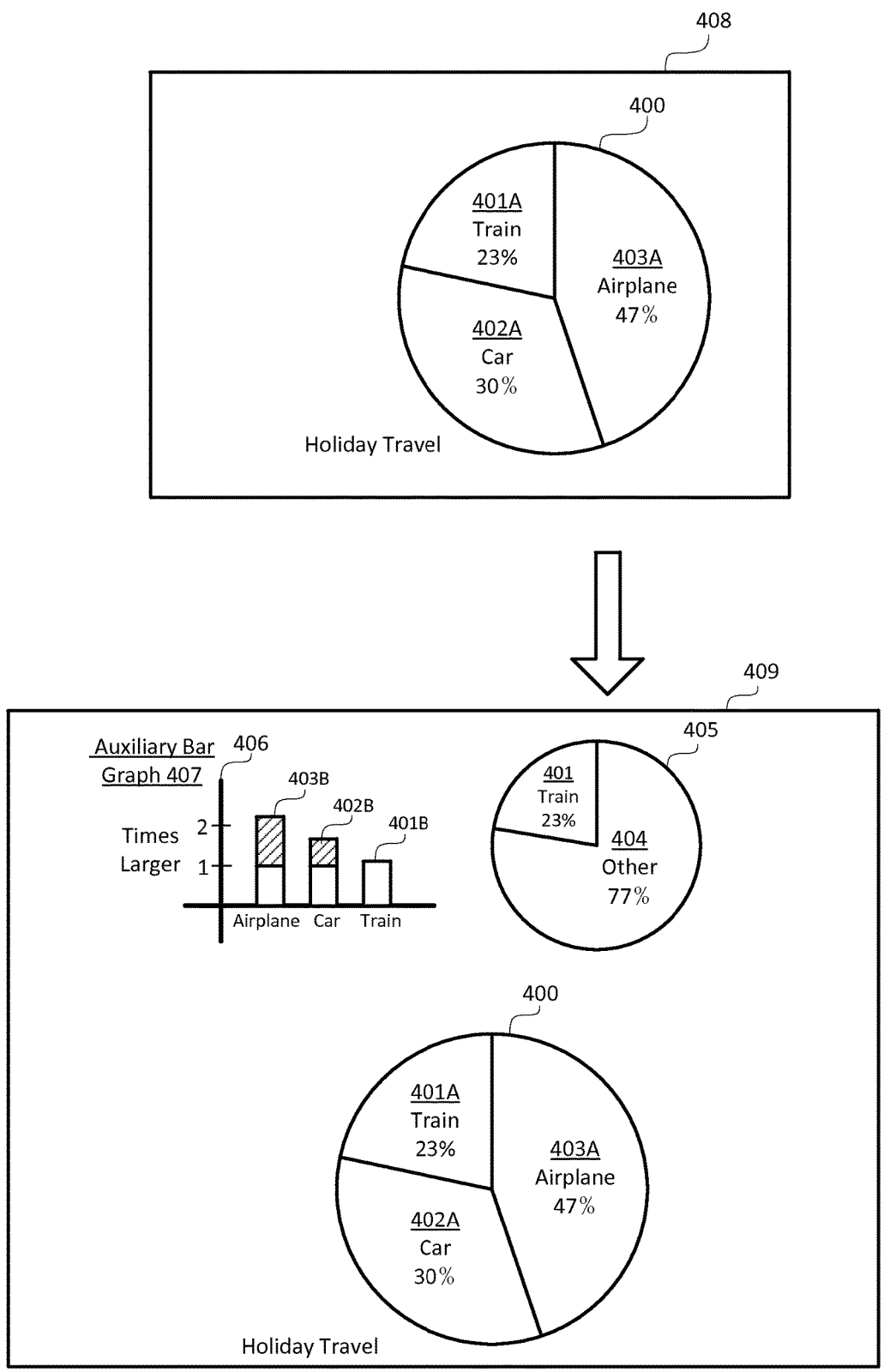
FIG. 4 is an example of a pie chart as displayed according to an embodiment of the present invention, first in an initial form, and then as a comparative chart.

Referring now to FIG. 4, there is shown an example of a display 408 including a pie chart in original form as displayed on display screen 103 according to an embodiment of the present invention. Original pie chart 400 depicts the results of a fictional survey of holiday travelers. Original pie chart 400, labeled "Holiday Travel," consists of a circle divided by three radii into sections 401A, 402A, and 403A. Each section represents one of three data entries having numeric values, labeled "Car," "Train," and "Airplane."

The entry represented by section 401A labeled "Train" has a value amounting to 23% of the total value of the data entries in the data set. Similarly, sections 402A and 403A, labeled "Car" and "Airplane," represent data entries with values amounting to 30% and 47% of the total value of the data entries in the data set, respectively.

Display 409 includes a comparative pie chart 405, wherein the data entry associated with section 401A (labeled "Train") has been selected as the baseline entry. In display 409, comparative pie chart 405 and auxiliary bar graph 407 are shown alongside original pie chart 400. In an alternate embodiment, original pie chart 400 is omitted when comparative pie chart 405 is shown.

Amended pie chart 405 is similar to original pie chart 400, but all entries other than the selected baseline entry are represented by a merged section 404 occupying the area originally occupied by both sections 402A and 403A. Such a display 409 can be presented, for example in response to any suitable user action, such as tapping or clicking on a region of pie chart 400, or causing an on-screen cursor to hover over it.

Auxiliary bar graph 407 contains rectangles 401B, 402B, and 403B, each representing a data entry from original pie chart 400. The height of each rectangle measured along Y-axis 406 represents that data entries value as a multiple of the baseline entry. Thus, auxiliary bar graph 407 presents the same data as original pie chart 400 using length rather than area for additional clarity. In one embodiment, in auxiliary bar graph 407 individual rectangles 402B, and 403B are divided to show comparison with rectangle 401B which corresponds to the selected baseline entry. In one embodiment, auxiliary bar graph 407 can include a horizontal line at a height level corresponding to the selected baseline entry, allowing comparisons to be made more easily.

Auxiliary bar graph 407 is optional and need not be included. Again, in one embodiment auxiliary bar graph 407 can be presented, for example in response to any suitable user action, such as tapping or clicking on a region of pie chart 400, or causing an onscreen cursor to hover over it.

User 100 may dynamically control the way quantitative data is presented in pie chart form on display screen 103 through user commands received by input device 102. For example, such commands can invoke or dismiss comparative graph 405, and/or change the baseline entry.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joys-tick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method of presenting a comparative graph displaying a plurality of data entries in graphical form, each data entry of the plurality of data entries having a value, the method comprising:
    displaying a first instance of a comparative graph on a display screen, the comparative graph comprising a baseline at a first uniform baseline value that extends across at least a portion of the comparative graph parallel to an axis in a first dimension and a plurality of graphical elements corresponding to the plurality of data entries, each graphical element having a dimension representing a value of a corresponding quantitative data entry relative to the axis in the first dimension, the first instance of the comparative graph portraying at least a first subset of graphical elements of the plurality of graphical elements in a first comparative form relative to the baseline;
    at an input device, receiving a first user input selecting a second uniform baseline value on the first instance of the comparative graph, the second uniform baseline value being an updated value from the first uniform baseline value; and
    responsive to receiving the first user input selecting the second uniform baseline value, displaying, on the display screen, a second instance of the comparative graph including the baseline at the second uniform baseline value, the second instance of the comparative graph updating at least the first subset of the graphical elements from the first comparative form to a second comparative form portraying at least a second subset of graphical elements of the plurality of graphical elements relative to the baseline having the second uniform baseline value.

2. The method of claim 1, wherein the first user input identifies one of the displayed plurality of data entries, and wherein the second uniform baseline value is established as a value corresponding to the identified quantitative data entry.

3. The method of claim 1, further comprising:
    at the input device, receiving a second user input dismissing the second instance of the comparative graph; and
    responsive to the second user input, dismissing the second instance of the comparative graph.

4. The method of claim 3, further comprising:
    responsive to the second user input, restoring the display of the first instance of the comparative graph.

5. The method of claim 1, further comprising:
    at the input device, receiving a third user input specifying a third uniform baseline value on the second instance of the comparative graph; and
    responsive to the third user input, adjusting, as a third instance of the comparative graph, the second instance of the comparative graph to portray each of at least a third subset of graphical elements of the plurality of graphical elements in a third comparative form, wherein the third instance of the comparative graph graphically depicts a third comparison between the baseline and the third subset of the graphical elements to indicate how the value of the quantitative data entry corresponding to each graphical element in the third subset compares to the third uniform baseline value.

6. The method of claim 1, further comprising:
    responsive to receiving the first user input, adjusting the second instance of the comparative graph to portray each of at least the second subset of the graphical elements from the plurality of graphical elements in a second comparative form, wherein the second instance of the comparative graph graphically depicts a comparison between the baseline and the second subset of the graphical elements to indicate how the value of the quantitative data entry corresponding to each graphical element in the second subset compares to the second uniform baseline value.

7. The method of claim 1, wherein:
    receiving the first user input comprises receiving user input to cause an on-screen cursor to hover over an area of the first instance of the comparative graph to identify a quantitative data entry; and
    the second uniform baseline value is established as a value corresponding to the identified quantitative data entry.

8. The method of claim 7, further comprising, responsive to receiving user input to cause the on-screen cursor to move so that it hovers over an area of the first instance of the comparative graph to identify a second quantitative data entry:
    establishing the second uniform baseline value as a value corresponding to the second quantitative data entry; and
    adjusting the second instance of the comparative graph to portray each of at least the second subset of the graphical elements from the plurality of graphical elements in the second comparative form, wherein the second instance of the comparative graph graphically depicts a comparison between the baseline and the second subset of the graphical elements to indicate how the value of the quantitative data entry corresponding to each graphical element of the plurality of graphical elements in the second subset compares to the second uniform baseline value.

9. The method of claim 7, further comprising, responsive to receiving user input to cause the on-screen cursor to move off of the second instance of the comparative graph, dismissing the second instance of the comparative graph.

10. The method of claim 1, wherein:
receiving the first user input comprises receiving user input activating an on-screen cursor at an area of the first instance of the comparative graph identifying a quantitative data entry; and
the first uniform baseline value is established as a value corresponding to the identified quantitative data entry.

11. The method of claim 10, further comprising, responsive to receiving user input activating an on-screen cursor at an area of the first instance of the comparative graph identifying a second quantitative data entry from the plurality of data entries:
establishing the second uniform baseline value as a value corresponding to the second quantitative data entry; and
adjusting, as the second instance of the comparative graph, the first instance of the comparative graph to portray each of at least the second subset of the graphical elements from the plurality of graphical elements in the second comparative form, wherein the second instance of the comparative graph graphically depicts a comparison between the baseline and the second subset of the graphical elements from the plurality of graphical elements to indicate how the value of the quantitative data entry corresponding to each graphical element in the second subset compares to the second uniform baseline value.

12. The method of claim 1, wherein:
receiving the first user input comprises detecting user contact with the display screen at a position identifying a quantitative data entry in the first instance of the comparative graph; and
the first uniform baseline value is established as a value corresponding to the identified quantitative data entry.

13. The method of claim 12, further comprising, responsive to detecting user contact with the display screen at a position identifying a second quantitative data entry:
establishing the second uniform baseline value as a value corresponding to the second quantitative data entry; and
adjusting, as the second instance of the comparative graph, the first instance of the comparative graph to portray each of at least the second subset of the graphical elements of the plurality of graphical elements in a comparative form, wherein the second instance of the comparative graph graphically depicts a comparison between the baseline and the second subset of the graphical elements from the plurality of graphical elements to indicate how the value of the quantitative data entry corresponding to each graphical element in the second subset compares to the second uniform baseline value.

14. The method of claim 1, wherein:
displaying the first instance of the comparative graph comprises displaying a first instance of a comparative bar graph comprising a plurality of bars corresponding to the plurality of data entries, each bar having a height representing the value of the corresponding quantitative data entry, the first instance of the comparative bar graph further comprising, for at least one bar, an indicator representing a difference between the first uniform baseline value and the value of the quantitative data entry corresponding to the bar; and
displaying a second instance of the comparative graph comprises displaying a second instance of a comparative bar graph comprising a plurality of bars corresponding to the plurality of data entries, each bar having a height representing the value of the corresponding quantitative data entry, the second instance of the comparative bar graph further comprising, for at least one bar, an indicator representing a difference between the second uniform baseline value and the value of the quantitative data entry corresponding to the bar.

15. The method of claim 14, wherein:
responsive to the quantitative data entry of the at least one bar having a value higher than the second uniform baseline value, splitting the bar corresponding to the quantitative data entry into a first portion representing the second uniform baseline value and a second portion representing a difference between the second uniform baseline value and the value of the quantitative data entry;
responsive to the quantitative data entry of the at least one bar having a value lower than the second uniform baseline value, displaying an additional bar segment representing a difference between the second uniform baseline value and the value of the quantitative data entry; and
the baseline extends across at least a portion of the comparative bar graph in a direction perpendicular to the bars of the second instance of the comparative bar graph.

16. The method of claim 15, wherein:
responsive to the quantitative data entry of the at least one bar having a value higher than the second uniform baseline value, labeling the second portion to numerically indicate a difference between the second uniform baseline value and the value of the quantitative data entry; and
responsive to the quantitative data entry of the at least one bar having a value lower than the second uniform baseline value, labeling the additional bar segment to numerically indicate a difference between the second uniform baseline value and the value of the quantitative data entry.

17. The method of claim 1, wherein:
displaying a first instance of the comparative graph comprises displaying a first instance of a comparative line graph comprising a plurality of data points corresponding to the plurality of data entries, each data point having a height representing a difference between the value of the corresponding quantitative data entry and the first uniform baseline value; and
displaying a second instance of the comparative graph comprises displaying a second instance of the comparative line graph comprising a plurality of data points corresponding to the plurality of data entries, each data point having a height representing a difference between the value of the corresponding quantitative data entry and the second uniform baseline value.

18. The method of claim 1, wherein:
displaying a first instance of the comparative graph comprises displaying a first instance of a pie chart comprising a plurality of sections, each section having an area representing the value of the corresponding quantitative data entry; and
displaying a second instance of the comparative graph comprises displaying a second instance of a comparative pie chart comprising:
a first section having an area representing the value of a quantitative data entry corresponding to the second uniform baseline value; and a second section having an area representing a sum of the values of the remaining data entries.

19. The method of claim 1, wherein:
displaying a first instance of the comparative graph comprises displaying a first pie chart comprising a plurality of sections corresponding to the plurality of data entries, each section having an area representing the value of the corresponding quantitative data entry; and
displaying a second instance of the comparative graph comprises displaying a comparative bar graph comprising a plurality of bars corresponding to the plurality of data entries, each bar having a height representing the value of the corresponding quantitative data entry, the comparative bar graph further comprising, for at least one bar, an indicator representing a difference between the second uniform baseline value and the value of the quantitative data entry corresponding to the bar.

20. The method of claim 1, wherein:
displaying a first instance of the comparative graph further comprises displaying a first pie chart comprising a plurality of sections corresponding to the plurality of data entries, each section having an area representing the value of the corresponding quantitative data entry; and
displaying a second instance of the comparative graph comprises:
displaying a comparative pie chart comprising:
a first section having an area representing the value of a quantitative data entry corresponding to the second uniform baseline value; and
a second section having an area representing a sum of the values of the remaining data entries; and
displaying a comparative bar graph comprising a plurality of bars corresponding to the plurality of data entries, each bar having a height representing the value of the corresponding quantitative data entry, the comparative bar graph further comprising, for at least one bar, an indicator representing a difference between the second uniform baseline value and the value of the quantitative data entry corresponding to the bar.

21. The method of claim 1, wherein displaying the second instance of the comparative graph comprises replacing the first instance of the comparative graph with the second instance of the comparative graph.

22. The method of claim 1, wherein displaying the first instance of the comparative graph comprises replacing the first instance of the comparative graph with the second instance of the comparative graph using a transition effect.

23. The method of claim 1, wherein displaying the second instance of the comparative graph comprises displaying the second instance of the comparative graph alongside the first instance of the comparative graph.

24. The method of claim 1, wherein displaying the first instance of the comparative graph comprises:
for each quantitative data entry having a value higher than the first uniform baseline value, splitting the graphical element corresponding to the quantitative data entry into a first portion representing the first uniform baseline value and a second portion representing a difference between the first uniform baseline value and the value of the quantitative data entry; and
responsive to the quantitative data entry having a value lower than the first uniform baseline value, displaying an additional graphical element having a dimension representing a difference between the first uniform baseline value and the value of the quantitative data entry.

25. A computer program product of presenting a comparative graph displaying a plurality of data entries in graphical form, each data entry of the plurality of data entries having a value, comprising:
a non-transitory computer-readable storage medium; and
computer program code, encoded on the medium, configured to cause at least one processor to perform the steps of:
causing a display screen to display a first instance of the comparative graph, the first instance of the comparative graph comprising a baseline at a first uniform baseline value that extends across at least a portion of the comparative graph parallel to an axis in a first dimension and a plurality of graphical elements corresponding to the plurality of data entries, each graphical element having a dimension representing a value of a corresponding quantitative data entry relative to the axis in the first dimension, the first instance of the comparative graph portraying at least a first subset of graphical elements of the plurality of graphical elements in a first comparative form relative to the baseline;
responsive to a first user input received via an input device, the first user input selecting a second uniform baseline value on the first instance of the comparative graph, the second uniform baseline value being an updated value from the first uniform baseline value; and
causing the display screen to display a second instance of the comparative graph including the baseline at the selected second uniform baseline value, the second instance of the comparative graph updating at least the first subset of the graphical elements portrayed in the first comparative form to portray at least a second subset of graphical elements of the plurality of graphical elements in a second comparative form portraying the at least a second subset of the graphical elements relative to the baseline having the second uniform baseline value.

26. The computer program product of claim 25, wherein the first user input identifies one of the displayed plurality of data entries, and wherein the second uniform baseline value is established as a value corresponding to the identified quantitative data entry.

27. The computer program product of claim 25, further comprising computer program code, encoded on the medium, configured to cause the at least one processor to perform the step of:
responsive to the third user input received via the input device, the third input specifying a third uniform baseline value on the second instance of the comparative graph, adjusting, as a third instance of the comparative graph, the second instance of the comparative graph to portray each of at least a third subset of graphical elements of the plurality of graphical elements in a third comparative form, wherein the third instance of the comparative graph graphically depicts a third comparison between the baseline and the third subset of the graphical elements to indicate how the value of the quantitative data entry corresponding to each graphical element in the third subset of the graphical elements compares to the third uniform baseline value.

28. The computer program product of claim 25, further comprising computer program code, encoded on the medium, configured to cause the at least one processor to perform the step of:

responsive to the first user input received via the input device, adjusting the second instance of the comparative graph to portray each of at least the second subset of the plurality of graphical elements in a second comparative form, wherein the second instance of the comparative graph graphically depicts a comparison between the baseline and the second subset of the graphical elements to indicate how the value of the quantitative data entry corresponding to each graphical element in the second subset compares to the second uniform baseline value.

29. The computer program product of claim 25, wherein:
the first user input comprises user input causing an on-screen cursor to hover over an area of the first instance of the comparative graph to identify a quantitative data entry; and
the second uniform baseline value is established as a value corresponding to the identified quantitative data entry.

30. The computer program product of claim 25, wherein:
the first user input comprises user input activating an on-screen cursor at an area of the first instance of the comparative graph identifying a quantitative data entry; and
the second uniform baseline value is established as a value corresponding to the identified quantitative data entry.

31. The computer program product of claim 25, wherein:
the first user input comprises user contact with the display screen at a position identifying a quantitative data entry in the first instance of the comparative graph; and
the second uniform baseline value is established as a value corresponding to the identified quantitative data entry.

32. The computer program product of claim 25, wherein:
the computer program code configured to cause the display screen to display a first instance of the comparative graph comprises computer program code configured to cause the display screen to display a first instance of a comparative bar graph comprising a plurality of bars corresponding to the plurality of data entries, each bar having a height representing the value of the corresponding quantitative data entry, the first instance of the comparative bar graph further comprising, for at least one bar, an indicator representing a difference between the first uniform baseline value and the value of the quantitative data entry corresponding to the bar; and
the computer program code configured to cause the display screen to display a second instance of the comparative graph comprises computer program code configured to cause the display screen to display a second comparative bar graph comprising a plurality of bars corresponding to the plurality of data entries, each bar having a height representing the value of the corresponding quantitative data entry, the second instance of the comparative bar graph further comprising, for at least one bar, an indicator representing a difference between the second uniform baseline value and the value of the quantitative data entry corresponding to the at least one bar.

33. The computer program product of claim 32, wherein:
responsive to the quantitative data entry of the at least one bar having a value higher than the second uniform baseline value, splitting the bar corresponding to the quantitative data entry into a first portion representing the second uniform baseline value and a second portion representing a difference between the second uniform baseline value and the value of the quantitative data entry; and
responsive to the quantitative data entry of the at least one bar having a value lower than the second uniform baseline value, displaying an additional bar segment representing a difference between the second uniform baseline value and the value of the quantitative data entry.

34. The computer program product of claim 25, wherein:
the computer program code configured to cause the display screen to display a first instance of the comparative graph comprises computer program code configured to cause the display screen to display a first instance of a comparative line graph comprising a plurality of data points corresponding to the plurality of data entries, each data point having a height representing a difference between the value of the corresponding quantitative data entry and the first uniform baseline value; and
the computer program code configured to cause the display screen to display a second instance of the comparative graph comprises computer program code configured to cause the display screen to display a second comparative line graph comprising a plurality of data points corresponding to the plurality of data entries, each data point having a height representing a difference between the value of the corresponding quantitative data entry and the second uniform baseline value.

35. The computer program product of claim 25, wherein:
the computer program code configured to cause the display screen to display a first instance of the comparative graph comprises computer program code configured to cause the display screen to display a first instance of a pie chart comprising:
a plurality of sections corresponding to the plurality of data entries, each section having an area representing the value of the corresponding quantitative data entry;
a first section having an area representing the value of a quantitative data entry corresponding to the second uniform baseline value; and
a second section having an area representing a sum of the values of the remaining data entries.

36. The computer program product of claim 25, wherein:
the computer program code configured to cause the display screen to display a first instance of the comparative graph comprises computer program code configured to cause the display screen to display a first pie chart comprising a plurality of sections corresponding to the plurality of data entries, each section having an area representing the value of the corresponding quantitative data entry; and
the computer program code configured to cause the display screen to display a second instance of the comparative graph comprises computer program code configured to cause the display screen to display a comparative bar graph comprising a plurality of bars corresponding to the plurality of data entries, each bar having a height representing the value of the corresponding quantitative data entry, the comparative bar graph further comprising, for at least one bar, an indicator representing a difference between the second uniform baseline value and the value of the quantitative data entry corresponding to the bar.

37. The computer program product of claim 25 wherein the computer program code configured to cause the display screen to display the second instance of the comparative graph comprises computer program code configured to cause the display screen to replace the first instance of the comparative graph with the second instance of the comparative graph using a transition effect.

38. The computer program product of claim 25, wherein the computer code configured to cause the display screen to display the first instance of the comparative graph comprises computer code configured to cause the display screen to:
for each quantitative data entry having a value higher than the first uniform baseline value, split the graphical element corresponding to the quantitative data entry into a first portion representing the first uniform baseline value and a second portion representing a difference between the first uniform baseline value and the value of the quantitative data entry; and
responsive to the quantitative data entry having a value lower than the first uniform baseline value, display an additional graphical element having a dimension representing a difference between the first uniform baseline value and the value of the quantitative data entry.

39. A system of presenting a comparative graph displaying a plurality of data entries in graphical form, each data entry of the plurality of data entries having a value, comprising:
a display screen, configured to display a first instance of a comparative graph, the comparative graph comprising a baseline at a first uniform baseline value that extends across at least a portion of the comparative graph parallel to an axis in a first dimension and a plurality of graphical elements corresponding to the plurality of data entries, each graphical element having a dimension representing a value of a corresponding quantitative data entry relative to the axis in the first dimension, the first instance of the comparative graph portraying at least a first subset of graphical elements of the plurality of graphical elements in a first comparative form relative to the baseline;
an input device, configured to receive a first user input selecting a second uniform baseline value on the first instance of the comparative graph, the second uniform baseline value being an updated value from the first uniform baseline value; and
a processor, communicatively coupled to the display screen and to the input device, configured to:
responsive to receiving the first user input selecting the second uniform baseline value, cause the display screen to display a second instance of the comparative graph including the baseline at the second uniform baseline value, the second instance of the comparative graph updating at least the first subset of the graphical elements from the first comparative form to a second comparative form portraying at least a second subset of graphical elements of the plurality of graphical elements relative to the baseline having the second uniform baseline value.

40. The system of claim 39, wherein the first user input identifies one of the displayed plurality of data entries, and wherein the second uniform baseline value is established as a value corresponding to the identified quantitative data entry.

41. The system of claim 39, wherein, responsive to the input device receiving the first user input specifying the second uniform baseline value on the first instance of the comparative graph, the processor is configured to cause the display screen to adjust, as the second instance of the comparative graph, the first instance of the comparative graph to portray each of at least the second subset of the graphical elements in the second comparative form, wherein the second instance of the comparative graph graphically depicts a second comparison between the baseline and the second subset of the graphical elements to indicate how the value of the quantitative data entry corresponding to each graphical element in the second subset compares to the second uniform baseline value.

42. The system of claim 41, wherein, responsive to the input device receiving a second user input specifying a third uniform baseline value, the processor is configured to cause the display screen to adjust, as a third instance of the comparative graph, the second instance of the comparative graph to portray each of at least a third subset of graphical elements of the plurality of graphical elements in a third comparative form, wherein the third instance of the comparative graph graphically depicts a third comparison between the baseline and the third subset of the graphical elements to indicate how the value of the quantitative data entry corresponding to each graphical element in the third subset compares to the third uniform baseline value.

43. The system of claim 39, wherein:
the first user input comprises user input causing an on-screen cursor to hover over an area of the first instance of the comparative graph to identify a quantitative data entry; and
the second uniform baseline value is established as a value corresponding to the identified quantitative data entry.

44. The system of claim 39, wherein:
the first user input comprises user input activating an on-screen cursor at an area of the first instance of the comparative graph identifying a quantitative data entry; and
the second uniform baseline value is established as a value corresponding to the identified quantitative data entry.

45. The system of claim 39, wherein the display screen comprises a touch-sensitive screen, and wherein:
the first user input comprises user contact with the touch-sensitive screen at a position identifying a quantitative data entry in the first instance of the comparative graph; and
the second uniform baseline value is established as a value corresponding to the identified quantitative data entry.

46. The system of claim 39, wherein:
the first instance of the comparative graph comprises displaying a first instance of a comparative bar graph comprising a plurality of bars corresponding to the plurality of data entries, each bar having a height representing the value of the corresponding quantitative data entry of the plurality of data entries, the first instance of the comparative graph further comprising, for at least one bar, an indicator representing a difference between the first uniform baseline value and the value of the quantitative data entry corresponding to the bar; and
the second instance of the comparative graph comprises displaying a second instance of the comparative bar graph comprising a plurality of bars corresponding to the plurality of data entries, each bar having a height representing the value of the corresponding quantitative data entry of the plurality of data entries, the second instance of the comparative bar graph further comprising, for at least one bar, an indicator representing a difference between the second uniform baseline value and the value of the quantitative data entry corresponding to the bar.

47. The system of claim 46, wherein:

responsive to the quantitative data entry of the at least one bar having a value higher than the second uniform baseline value, split the bar corresponding to the quantitative data entry into a first portion representing the second uniform baseline value and a second portion representing a difference between the second uniform baseline value and the value of the quantitative data entry; and responsive to the quantitative data entry of the at least one bar having a value lower than the second uniform baseline value, display an additional bar segment representing a difference between the second uniform baseline value and the value of the quantitative data entry.

48. The system of claim 39, wherein:

the first instance of the comparative graph comprises displaying a first instance of a comparative line graph comprising a plurality of data points corresponding to the plurality of data entries, each data point having a height representing a difference between the value of the corresponding quantitative data entry and the first uniform baseline value; and the second instance of the comparative graph comprises a second instance of the comparative line graph comprising a plurality of data points corresponding to the plurality of data entries, each data point having a height representing a difference between the value of the corresponding quantitative data entry and the second uniform baseline value.

49. The system of claim 39, wherein:

the first instance of the comparative graph comprises:

a first instance of a pie chart comprising a plurality of sections corresponding to the plurality of data entries, each section having an area representing the value of the corresponding quantitative data entry; and the second instance of the comparative graph comprises a second instance of the pie chart comprising:

a first section having an area representing the value of a quantitative data entry corresponding to the second uniform baseline value; and a second section having an area representing a sum of the values of the remaining data entries.

50. The system of claim 39, wherein:

the first instance of the comparative graph comprises a plurality of sections corresponding to the plurality of data entries, each section having an area representing the value of the corresponding quantitative data entry; and the second instance of the comparative graph comprises a comparative bar graph comprises a plurality of bars corresponding to the plurality of data entries, each bar having a height representing the value of the corresponding quantitative data entry, the comparative bar graph further comprising, for at least one bar, an indicator representing a difference between the second uniform baseline value and the value of the quantitative data entry corresponding to the bar.

51. The system of claim 39, wherein the processor is configured to cause the display screen to replace the first instance of the comparative graph with the second instance of the comparative graph using a transition effect.

52. The system of claim 39, wherein the display screen is configured to:

for each quantitative data entry in the first instance of the comparative graph having a value higher than the first uniform baseline value, split the graphical element corresponding to the quantitative data entry into a first portion representing the first uniform baseline value and a second portion representing a difference between the first uniform baseline value and the value of the quantitative data entry; and responsive to the quantitative data entry having a value lower than the first uniform baseline value, display an additional graphical element having a dimension representing a difference between the first uniform baseline value and the value of the quantitative data entry.

* * * * *